United States Patent
Shim et al.

(10) Patent No.: US 8,290,478 B2
(45) Date of Patent: Oct. 16, 2012

(54) SYSTEM AND METHOD OF TRANSMITTING EMOTICONS IN MOBILE COMMUNICATION TERMINALS

(75) Inventors: Jaesung Shim, Seoul (KR); Se Hee Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 851 days.

(21) Appl. No.: 11/556,341

(22) Filed: Nov. 3, 2006

(65) Prior Publication Data
US 2007/0101005 A1 May 3, 2007

(30) Foreign Application Priority Data
Nov. 3, 2005 (KR) .................. 10-2005-0104991

(51) Int. Cl.
*H04L 29/08* (2006.01)
(52) U.S. Cl. .................. 455/414.4; 455/466; 455/412.1; 709/206
(58) Field of Classification Search .................. 455/466, 455/414.4, 566; 709/206
See application file for complete search history.

(56) References Cited

U.S. PATENT DOCUMENTS

| | | | | |
|---|---|---|---|---|
| 7,426,694 B2 * | 9/2008 | Gross et al. | .................. | 715/762 |
| 7,484,176 B2 * | 1/2009 | Blattner et al. | .................. | 715/758 |
| 7,607,097 B2 * | 10/2009 | Janakiraman et al. | .................. | 715/753 |
| 2002/0077135 A1 * | 6/2002 | Hyon | .................. | 455/466 |
| 2002/0086689 A1 * | 7/2002 | Moran et al. | .................. | 455/466 |
| 2003/0002633 A1 * | 1/2003 | Kredo et al. | .................. | 379/88.08 |
| 2004/0018858 A1 * | 1/2004 | Nelson | .................. | 455/566 |
| 2004/0024822 A1 * | 2/2004 | Werndorfer et al. | .................. | 709/206 |
| 2004/0147814 A1 * | 7/2004 | Zancho et al. | .................. | 600/300 |
| 2004/0162877 A1 * | 8/2004 | Van Dok et al. | .................. | 709/204 |
| 2005/0033814 A1 * | 2/2005 | Ota | .................. | 709/206 |
| 2005/0143102 A1 * | 6/2005 | McEvilly et al. | .................. | 455/466 |
| 2005/0143108 A1 * | 6/2005 | Seo et al. | .................. | 455/466 |
| 2005/0144237 A1 * | 6/2005 | Heredia et al. | .................. | 709/206 |
| 2005/0156873 A1 * | 7/2005 | Walter et al. | .................. | 345/156 |
| 2005/0163379 A1 * | 7/2005 | Zimmermann | .................. | 382/190 |
| 2006/0009243 A1 * | 1/2006 | Dahan et al. | .................. | 455/466 |
| 2006/0015560 A1 * | 1/2006 | MacAuley et al. | .................. | 709/206 |
| 2006/0015812 A1 * | 1/2006 | Cunningham et al. | .................. | 715/535 |
| 2006/0031375 A1 * | 2/2006 | Danker et al. | .................. | 709/207 |
| 2006/0089147 A1 * | 4/2006 | Beaty | .................. | 455/445 |
| 2006/0167992 A1 * | 7/2006 | Cheung et al. | .................. | 709/204 |
| 2006/0206833 A1 * | 9/2006 | Capper et al. | .................. | 715/773 |
| 2006/0212818 A1 * | 9/2006 | Lee | .................. | 715/753 |
| 2006/0242593 A1 * | 10/2006 | Gaebel | .................. | 715/771 |

(Continued)

FOREIGN PATENT DOCUMENTS
KR 10-2005-0020386 3/2005
(Continued)

*Primary Examiner* — Rafael Pérez-Gutiérrez
*Assistant Examiner* — Allahyar Kasraian
(74) *Attorney, Agent, or Firm* — Lee, Hong, Degerman, Kang & Waimey (57) ABSTRACT

An apparatus and method transmitting emoticons in mobile communication terminals are disclosed by which compatibility in exchanging graphic emoticons between mobile communication terminals can be ensured. The present invention includes receiving a transmission request message in a first mobile communication terminal, the transmission request message related to a first graphic emoticon and including identification information for the first graphic emoticon, identifying a second graphic emoticon according to the transmission request message, and transmitting the second graphic emoticon to a second mobile communication terminal, wherein the second graphic emoticon comprises image data in a format decodable by the second mobile communication terminal.

17 Claims, 7 Drawing Sheets

U.S. PATENT DOCUMENTS

| | | | |
|---|---|---|---|
| 2007/0094330 A1* | 4/2007 | Russell | 709/206 |
| 2007/0168863 A1* | 7/2007 | Blattner et al. | 715/706 |
| 2008/0048979 A1* | 2/2008 | Ruttenberg | 345/158 |
| 2008/0280633 A1* | 11/2008 | Agiv | 455/466 |

FOREIGN PATENT DOCUMENTS

| | | | |
|---|---|---|---|
| KR | 20050019175 | * | 3/2005 |

* cited by examiner

|  | Communication service provider | Manufacturer |
|---|---|---|
| MS(1) | Company-A | Company-K |
| MS(2) | Company-A | Company-L |
| MS(3) | Company-B | Company-K |
| MS(4) | Company-B | Company-M |
| MS(N) | Company-C | Company-N |

| ID info. of 1st graphic emoticon | 2nd graphic emoticon |
|---|---|
| a147564 ( 🙂 ) | 🙂 |
| b650457 ( 😁 ) | 😁 |
| c325751 ( 😛 ) | 😛 |
| d587144 ( ☹ ) | ☹ |

FIG. 5A

| ID info. of 1st graphic emoticon | Category |
|---|---|
| a147564 ( 😊 ) | Smile |
| b650457 ( 😁 ) | Grin |
| c325751 ( 😛 ) | Teasing smile |
| d587144 ( ☹ ) | Sullen look |

FIG. 5B

| Category | ID info. of 2nd graphic emoticon |
|---|---|
| Smile | 😊 |
| Grin | 😁 |
| Teasing smile | 😛 |
| Sullen look | ☹ |

SYSTEM AND METHOD OF TRANSMITTING EMOTICONS IN MOBILE COMMUNICATION TERMINALS

CROSS-REFERENCE TO RELATED APPLICATIONS

Pursuant to 35 U.S.C. §119(a), this application claims the benefit of earlier filing date and right of priority to Korean Application No. 10-2005-0104991, filed Nov. 3, 2005, the contents of which are is incorporated by reference herein in its entirety.

FIELD OF THE INVENTION

The present invention relates to a system and method for transmitting emoticons in mobile communication terminals and more particularly, to a method for exchanging emoticons between mobile communication terminals. Although the present invention is suitable for a wide scope of applications, it is particularly suitable for transmitting a graphic emoticon requested by one mobile communication terminal to another mobile communication terminal.

DESCRIPTION OF THE RELATED ART

Generally, users exchange messages with each other as well as talk to each other through voice communications using mobile communication terminals. In particular, they exchange text type character messages using a short message service (hereinafter abbreviated SMS) or a multimedia message service (hereinafter abbreviated MMS) in order to transfer photos, moving pictures or music with text.

A user of a mobile communication terminal occasionally includes emoticons in a message. 'Emoticon' is a combination of emotion and an icon. A user uses Emoticons in order to express her/his emotion efficiently and concisely.

For instance, '*^^*' is used to express a good feeling. '-,.-' is used to express a bad feeling. Therefore, '*^^*' and '-,.-' are examples of emoticons.

Generally, an emoticon is represented in a text format by combining the characters of a keyboard or keypad. Recently, graphic emoticons generated in graphic or image format are globally used.

A graphic emoticon is transmitted to a mobile communication terminal by first selecting one of the graphic emoticons (image data) stored in a user's mobile communication terminal. Subsequently, the selected graphic emoticon is transmitted to another mobile communication terminal using a wireless data service.

However, since graphic emoticons (image data) stored in mobile communication terminals are prepared by manufacturers of the mobile communication terminals or communication service providers, they differ from each other in format according to the manufacturers or communication service providers. If a manufacturer or communication service provider of a mobile communication terminal receiving a graphic emoticon differs from that of the mobile communication terminal that transmitted the graphic emoticon, the receiving mobile communication terminal has difficulty in decoding or displaying the received graphic emoticon correctly.

SUMMARY OF THE INVENTION

One object of the present invention is to provide a system and method for transmitting emoticons in mobile communication terminals by which compatibility in exchanging graphic emoticons between mobile communication terminals can be achieved by converting a graphic emoticon that is to be transmitted by a transmitting mobile communication terminal and transmitting the converted graphic emoticon to a receiving mobile communication terminal. Another object of the present invention is to provide a system and method for transmitting emoticons in mobile communication terminals by which only identification information for an emoticon having data size relatively smaller than the data size of the corresponding graphic emoticon image data is transmitted after the graphic emoticon is converted.

In one aspect of the present invention, a method of transmitting emoticons in a mobile communication terminal is provided. The method includes receiving a message requesting transmission of a first graphic emoticon to a receiving mobile communication terminal, the message including first emoticon identification information related to the first graphic emoticon, identifying a second graphic emoticon according to the first emoticon identification information and transmitting second emoticon identification information related to the second graphic emoticon to the receiving mobile communication terminal, wherein the second emoticon identification information includes data in a format decodable by the receiving mobile communication terminal.

It is contemplated that the message further includes metadata related to the first graphic emoticon. It is further contemplated that the message includes first terminal information related to at least one of a manufacturer of the mobile communication terminal and a communication service provider for the mobile communication terminal.

It is contemplated that the message conforms to at least one specification for a multimedia message service (MMS). It is further contemplated that identifying the second graphic emoticon includes identifying a category of the first graphic emoticon according to the first emoticon identification information and identifying the second emoticon identification information corresponding to the category.

It is contemplated that the message includes a phone number of the receiving mobile communication terminal and identifying the second graphic emoticon includes identifying receiving terminal information related to the receiving mobile communication terminal according to the phone number and identifying the second emoticon information according to the first terminal information and the receiving terminal information. It is further contemplated that the receiving terminal information includes at least one of a manufacturer for the receiving mobile communication terminal and a communication service provider for the receiving mobile communication terminal.

It is contemplated that transmitting the second emoticon identification information is performed according to at least one specification for a multimedia message service (MMS). It is further contemplated that the second emoticon identification includes image data of the second emoticon. Preferably, the second emoticon identification information includes information related to an emoticon stored in the receiving mobile communication terminal.

In another aspect of the present invention, an apparatus for transmitting emoticons in a mobile communication terminal is provided. The apparatus includes a transmission request receiving unit adapted to receive a message requesting transmission of a first graphic emoticon to a receiving mobile communication terminal, the message including first emoticon identification information related to the first graphic emoticon, a converting unit adapted to identify a second graphic emoticon according to the first emoticon identification information and a transmitting unit adapted to transmit second emoticon identification information related to the second graphic emoticon to the receiving mobile communication terminal, wherein the second emoticon identification information includes data in a format decodable by the receiving mobile communication terminal.

It is contemplated that the apparatus further includes an emoticon database including conversion data related to a correspondence between the second graphic emoticon and the first graphic emoticon and wherein the converting unit is adapted to identify the second graphic emoticon according to the first emoticon identification information with reference to the emoticon database. It is further contemplated that the message further includes metadata related to the first graphic emoticon.

It is contemplated that the message includes first terminal information related to at least one of a manufacturer of the mobile communication terminal and a communication service provider for the mobile communication terminal. It is further contemplated that the transmission request receiving unit is further adapted to receive a message conforming to at least one specification for a multimedia message service (MMS).

It is contemplated that the converting unit is further adapted to identify the second graphic emoticon by identifying a category of the first graphic emoticon according to the first emoticon identification information and identifying the second emoticon identification information corresponding to the category. It is further contemplated that the apparatus further includes a receiving terminal information database including information related to the receiving mobile communication terminal and the message includes a phone number of the receiving mobile communication terminal and the converting unit is further adapted to identify the second graphic emoticon by identifying receiving terminal information related to the receiving mobile communication terminal according to the phone number with reference to the receiving terminal information database and identifying the second emoticon information according to the first terminal information and the receiving terminal information.

It is contemplated that the receiving terminal information includes at least one of a manufacturer for the receiving mobile communication terminal and a communication service provider for the receiving mobile communication terminal. It is further contemplated that the transmitting unit is further adapted to transmit the second emoticon identification information according to at least one specification for a multimedia message service (MMS).

It is contemplated that the second emoticon identification includes image data of the second emoticon. It is further contemplated that the second emoticon identification information includes information related to an emoticon stored in the receiving mobile communication terminal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The mobile communication terminals of the present invention should be construed as including wire phone terminals, PDAs, notebook computers and desktop computers as well as cellular phones and PCS phones. The graphic emoticons of the present invention should be construed as including all data incompatible between terminals as well as image emoticons and special characters.

Figure 1:
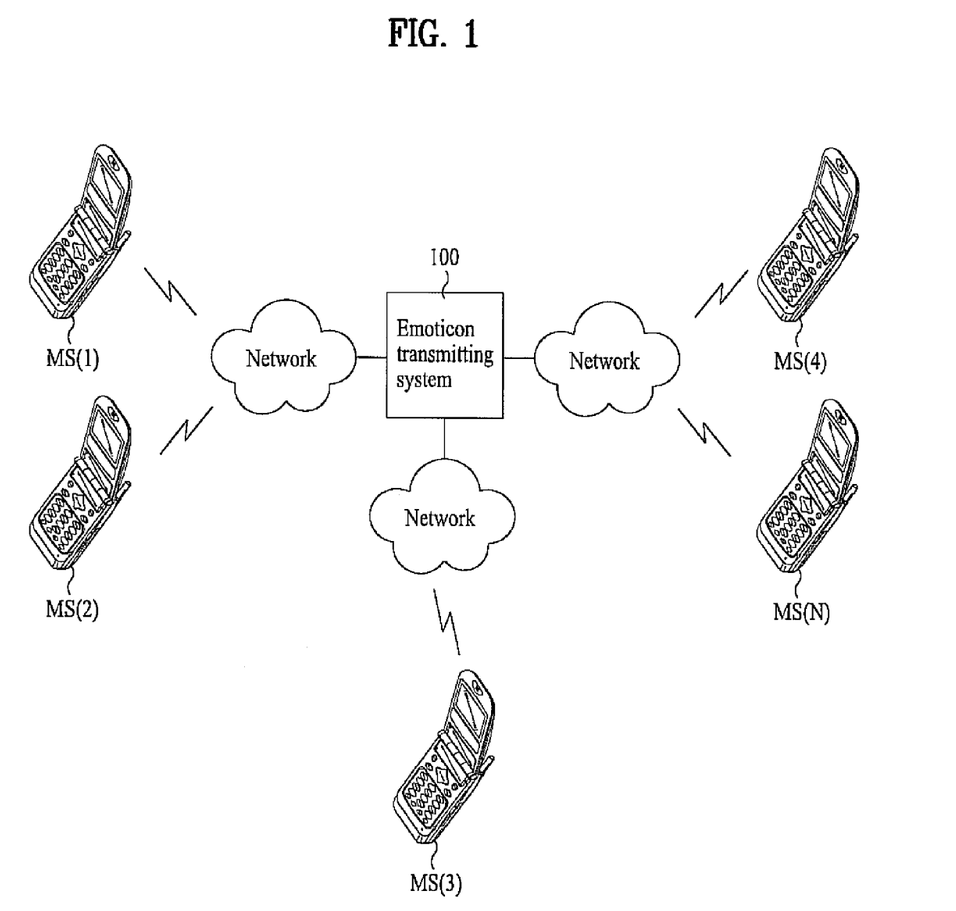
FIG. 1 illustrates a diagram of a network configuration of an emoticon transmitting system according to one embodiment of the present invention.

FIG. 1 illustrates a network configuration of a system according to one embodiment of the present invention. As illustrated in FIG. 1, an emoticon transmitting system 100 is interconnected with a plurality of mobile communication terminals MS(1), MS(2), MS(3), MS4(4) and MS(N) via a network. The network facilitates data communication between the mobile communication terminals and may include a base station (BTS), a base station controller (BSC), a mobile switching center (MSC) and a home location register (HLR).

Figure 2:
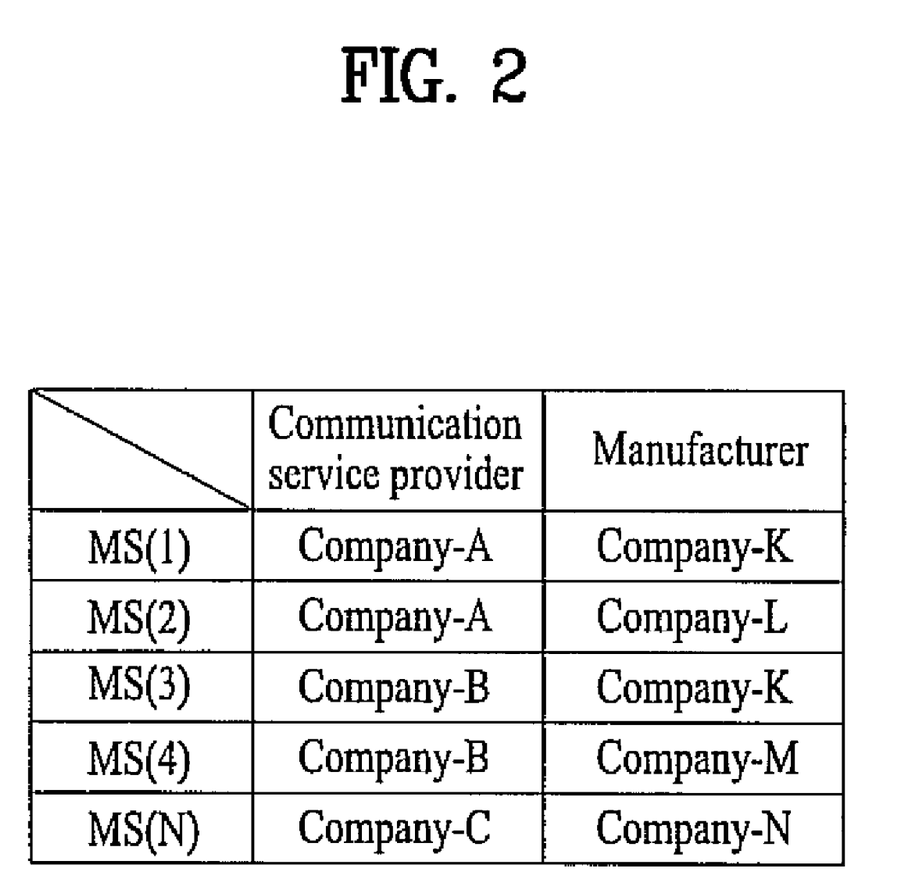
FIG. 2 illustrates a table of typical communication service providers and manufacturers of the mobile communication terminals illustrated in FIG. 1.

FIG. 2 illustrates a table of typical communication service providers and manufacturers of the mobile communication terminals MS(1) to MS(N) illustrated in FIG. 1. As illustrated in FIG. 2, the respective communication service providers and manufacturers of mobile communication terminals MS(1), MS(2), MS(3), MS(4) and MS(N) are indicated For example, the communication service provider and manufacturer of mobile communication terminal MS(1) are company-A and company-K, respectively. Furthermore, the communication service provider and manufacturer of the mobile communication terminal MS(2) are company-A and company-L, respectively.

Specifically, the same company services mobile communication terminals MS(1) and MS(2) but they have different manufacturers. Furthermore, mobile communication terminal MS(2) differs from mobile communication terminals MS(3), MS(4) and MS(N) in both communication service provider and manufacturer.

As illustrated in FIG. 2, a plurality of the mobile communication terminals MS(1), MS(2), MS(3), MS(4) and MS(N) differ from each other in at least one of communication service provider and manufacturer. The formats of graphic emoticons differ between communication service providers and manufacturers.

Figure 3:
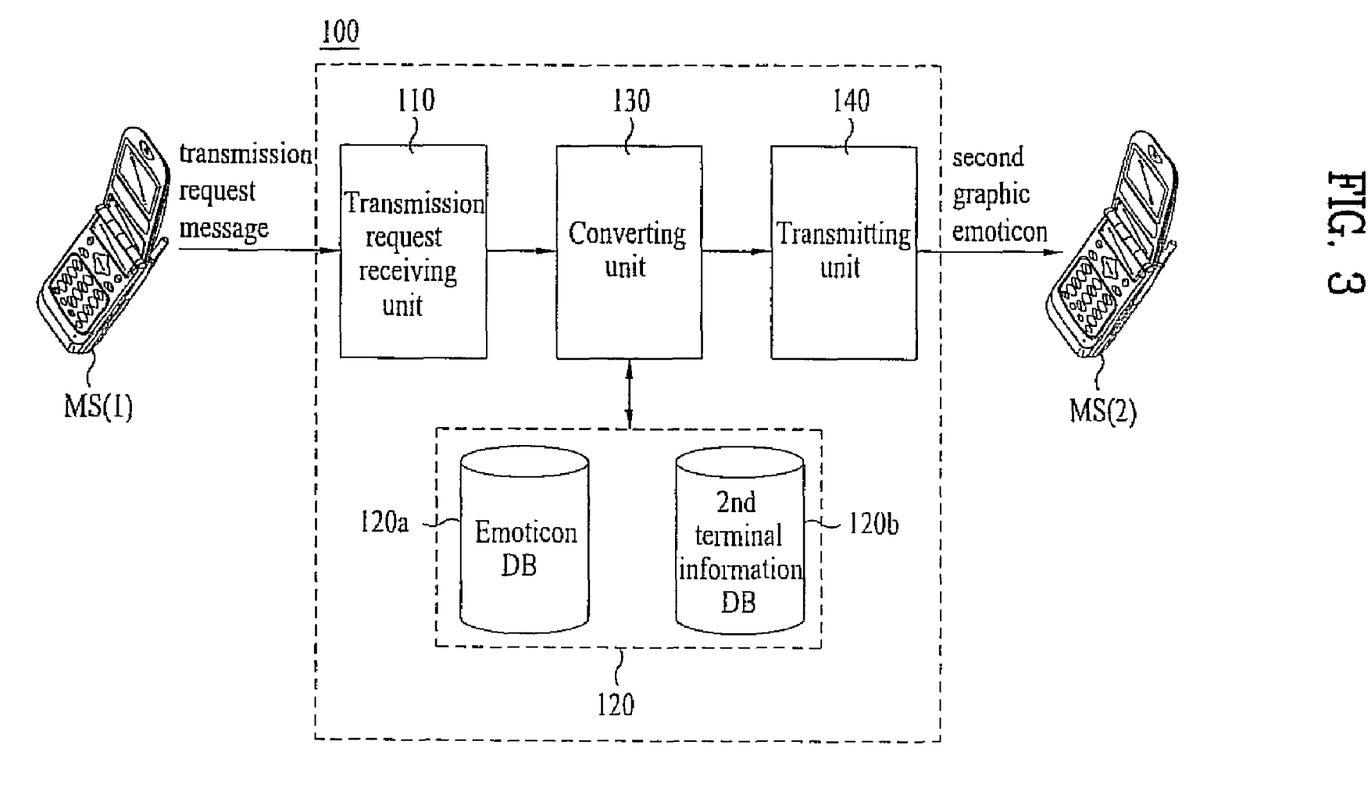
FIG. 3 illustrates a block diagram of the emoticon transmitting system in FIG. 1.

FIG. 3 illustrates a block diagram of the emoticon transmitting system 100 of FIG. 1. As illustrated in FIG. 3, the emoticon transmitting system 100 includes a transmission request receiving unit 110, a memory unit 120, a converting unit 130 and a transmitting unit 140.

The transmission request receiving unit 110 receives a transmission request message from the first mobile communication terminal MS(1) for a first graphic emoticon including identification information for the first graphic emoticon. The first graphic emoticon is an emoticon selected by a user of the first mobile communication terminal MS(1) that is to be transmitted to a second mobile communication terminal MS(2) and is selected from a plurality of graphic emoticons stored in the first mobile communication terminal The transmission request message may include identification information for the first graphic emoticon, metadata of the first graphic emoticon, image data of the first graphic emoticon, first terminal information for the first mobile communication terminal MS(1) and phone number of the second mobile communication terminal MS(2). However, the implementations of the present invention are not limited by this disclosure.

Identification information for the first graphic emoticon refers to information that specifies the first graphic emoticon between the first mobile communication terminal MS(1) and the emoticon transmitting system 100. The identification information may include the image data of the first graphic emoticon itself.

The metadata of the first graphic emoticon refers to text data related to attributes of the first graphic emoticon. For example, if the first graphic emoticon is a picture representing a smiling face, the metadata of the first graphic emoticon may correspond to 'laughter', 'face' or 'smile.'

The image data of the first graphic emoticon refers to data related to each pixel configuring the first graphic emoticon. The image data may correspond to a raster image or vector graphic image.

The first terminal information may include information related to a manufacturer of the first mobile communication terminal MS(1) or communication service provider information of the first mobile communication terminal. The phone number of the second mobile communication terminal MS(2) refers to information that specifies the second mobile communication terminal and is not limited to a serial number of 8~11 digits but could also be an IP address or other identification.

The memory unit 120 can store an emoticon database 120*a* and a second terminal information database 120*b*. The emoticon database 120*a* stores information related to the second graphic emoticon according to the first graphic emoticon.

Specifically, a field of the emoticon data base 120*a* may include at least one of identification information for the first graphic emoticon or image data of the first graphic emoticon and/or category and identification information for the second graphic emoticon or image data of the second graphic emoticon. In this way, the image data related to the second graphic emoticon corresponds to a format decodable by the second mobile communication terminal MS(2).

The identification information related to for the second graphic emoticon specifies a graphic emoticon between the emoticon transmitting system 100 and the second mobile communication terminal MS(2). If the second mobile communication terminal MS(2) stores the image data related to the second graphic emoticon, it is possible to transmit only the identification information related to the second graphic emoticon to the second mobile communication terminal.

Figure 4:
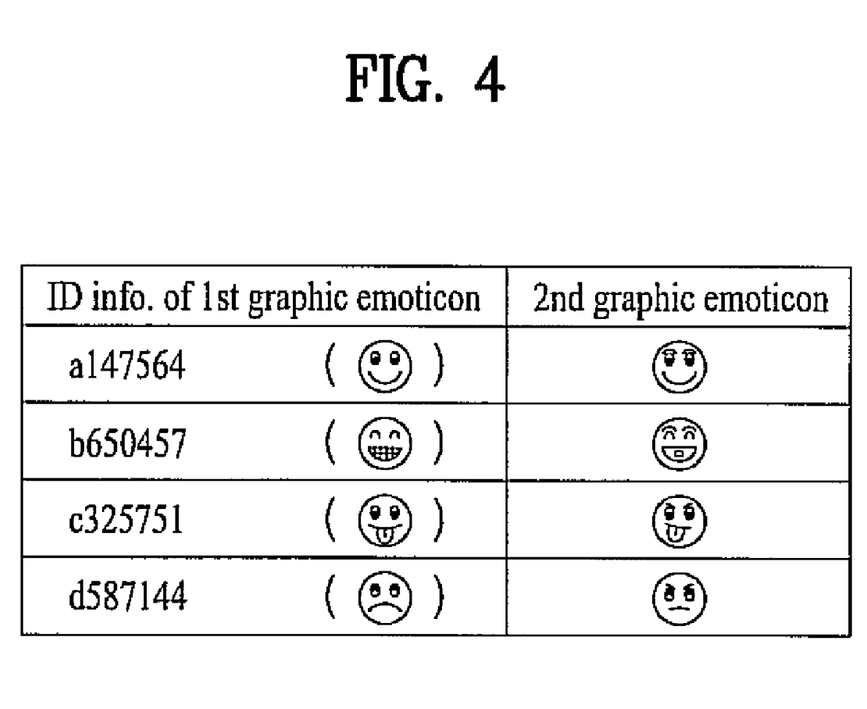
FIG. 4 illustrates a table of typical second graphic emoticon information corresponding to first graphic emoticons stored in the emoticon database illustrated in FIG. 3.

FIG. 4 illustrates a table of typical second graphic emoticon information according to first graphic emoticons stored in the emoticons database 120*a* illustrated in FIG. 3. Both identification information related to the first graphic emoticon and the image data of the second graphic emoticon are illustrated.

Figure 5A:
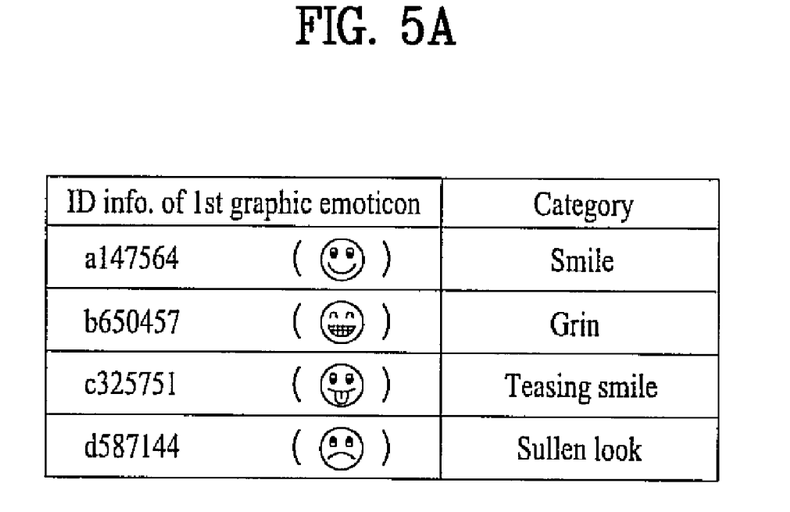
FIG. 5A and FIG. 5B illustrate additional tables of typical second graphic emoticon information corresponding to first graphic emoticons stored in the emoticon database illustrated in FIG. 3.
Figure 5B:
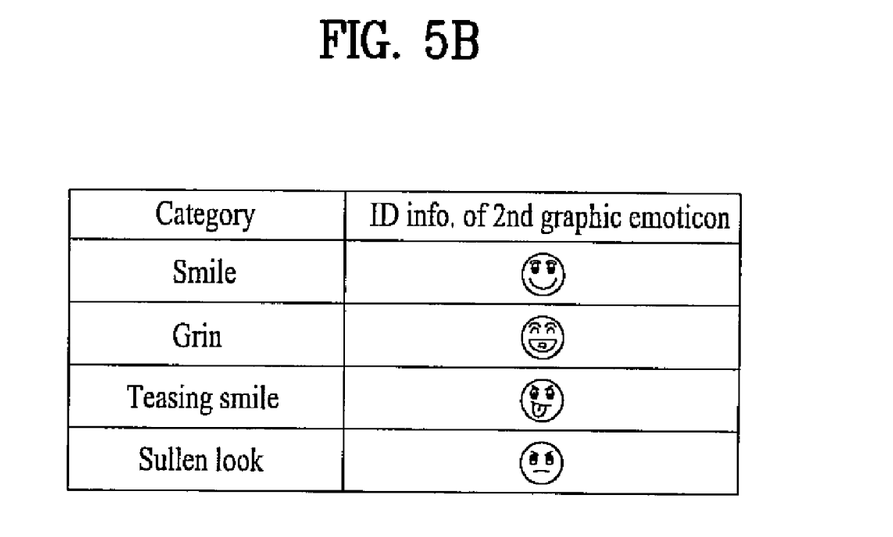

FIG. 5A and FIG. 5B illustrate additional tables of typical second graphic emoticon information according to first graphic emoticons stored in the emoticon database 120*a* illustrated in FIG. 3, respectively. FIG. 5A illustrates the identification and category of the first graphic emoticon. FIG. 5B illustrates the category and image data of the second graphic emoticon.

The second terminal information database 120*b* of the memory unit 120 stores second terminal information such as phone numbers, according to manufacturer information and/or communication service provider information. For example, if a phone number of the second mobile communication terminal MS(2) is '011-234-5678', the manufacturer information and/or the communication service provider of the second mobile communication terminal may be obtained using the second terminal database 120*b*.

The system may include second terminal information database 120*b*. When a request for the second terminal information corresponding to a specific phone number is made to a system that includes the second terminal information database 120*b*, a corresponding result is received.

The converting unit 130 retrieves the second graphic emoticon according to the transmission request message. The transmitting unit 140 transmits the second graphic emoticon to the second mobile communication terminal MS(2).

A detailed example is provided for the case where the emoticon database 120*a* stores the first graphic emoticon identification information, the category and the second graphic emoticon.

The converting unit 130 identifies a category of the first graphic emoticon in the emoticon database 120*a* according to the identification information in the transmission request message for the first graphic emoticon, such as metadata of the first graphic emoticon and the first terminal information for the first graphic emoticon. The converting unit 130 then identifies the second terminal information of the second mobile communication terminal MS(2) with reference to the second terminal information database 120*b* according to a phone number of the second mobile communication terminal contained in the transmission request message.

Subsequently, the converting unit 130 retrieves the second graphic emoticon, such as image data or identification information, using the identified category and second terminal information. If the second mobile communication terminal MS(2) stores the image data of the second graphic emoticon, only the identification information for the second graphic emoticon need be retrieved and the image data of the second graphic emoticon need not be retrieved.

Finally, the transmitting unit 140 transmits the second graphic emoticon retrieved by the converting unit 130 to the second mobile communication terminal MS(2). When transmitting the second graphic emoticon to the second mobile communication terminal MS(2), the transmitting unit 140 conforms to the specifications of a multimedia message service (MMS). However, these specifications not limit the implementations of the present invention.

Figure 6:
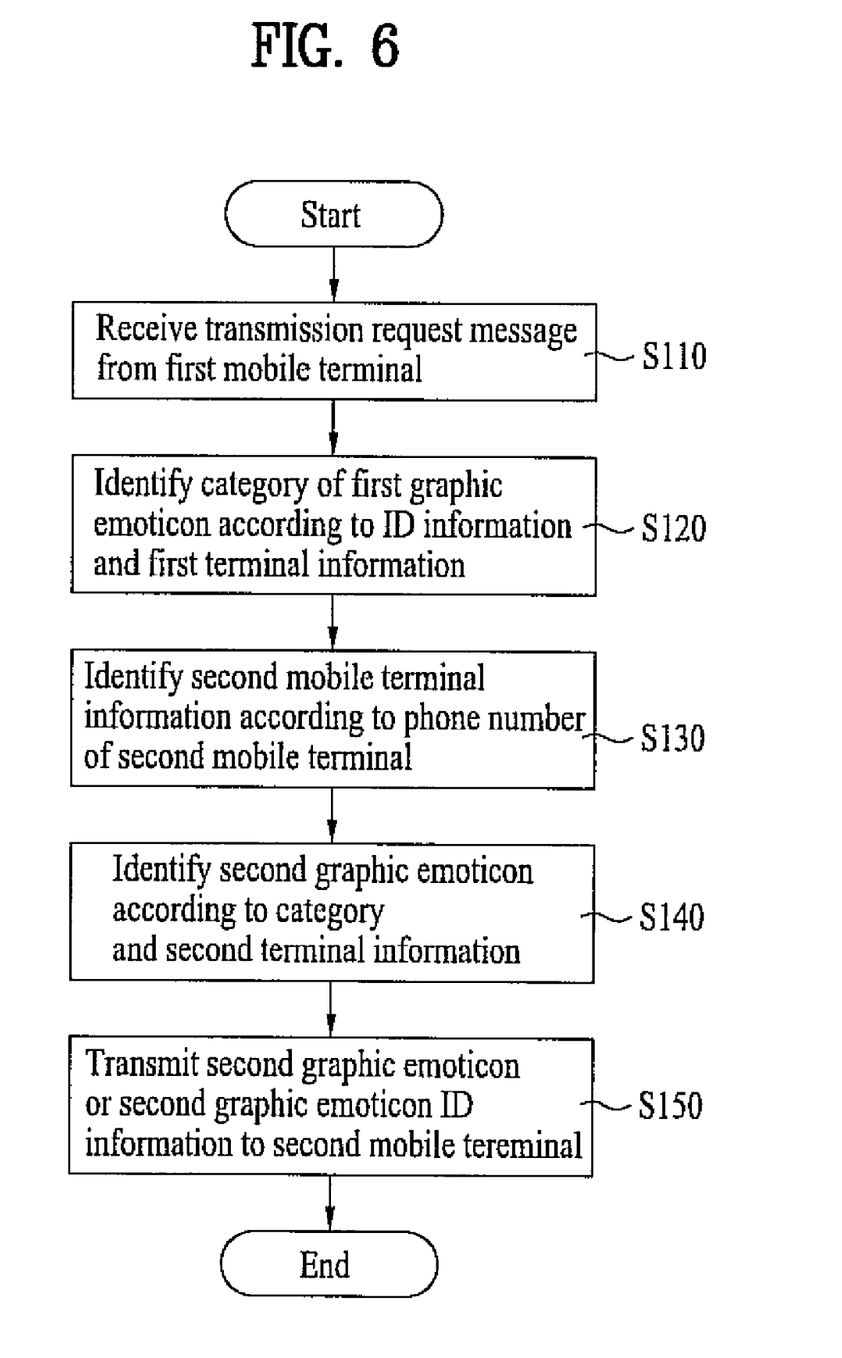
FIG. 6 illustrates a method of transmitting an emoticon according to one embodiment of the present invention.

FIG. 6 illustrates a flowchart of a method for transmitting an emoticon according to one embodiment of the present invention. As illustrated in FIG. 6, a transmission request message is received from a first mobile communication terminal MS(1) (S110).

Figure 7:
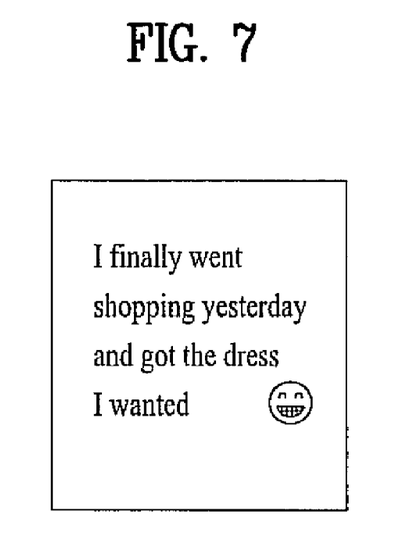
FIG. 7 illustrates a screen of a first mobile communication terminal performing the method of FIG. 6 in order to input a transmission request message including a first graphic emoticon.

FIG. 7 illustrates a typical screen of the first mobile communication terminal MS(1) for entering a transmission request message including a first graphic emoticon. The transmission request message may be a message composed on the screen illustrated in FIG. 7.

The category of the first graphic emoticon in the transmission request message received in step S110 is identified according to identification information, such as metadata and first terminal information of the first graphic emoticon (S120). For example, if the identification information for the first graphic emoticon is 'a147564', a category of 'smile' is identified according to the emoticon database illustrated in FIG. 5A.

The emoticon transmitting system identifies second terminal information according to a phone number of the second mobile communication terminal MS(2) contained in the transmission request message received in step S110 (S130). In some cases, step S130 may be skipped.

Subsequently, a second graphic emoticon is identified according to the category identified in step S120 and the second terminal information identified in step S130 (S140). For example, if the identified category is 'smile', image data or identification information for the second graphic emoticon is identified with reference to the emoticon database illustrated in FIG. 5B.

Figure 8:
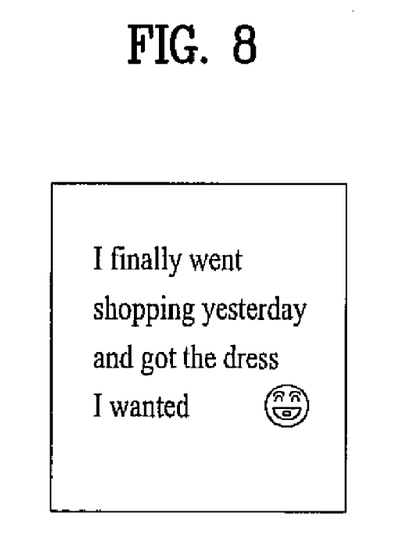
FIG. 8 illustrates a screen of a second mobile communication terminal performing the method of FIG. 6 in order to display a message including a second graphic emoticon.

Finally, the second graphic emoticon identified in step S140 is transmitted to the second mobile communication terminal MS(2) (S150). FIG. 8 illustrates a typical screen of the second mobile communication terminal MS(2) displaying a message including the second graphic emoticon. It can be seen that the first graphic emoticon, illustrated in FIG. 7, is converted to the second graphic emoticon, illustrated in FIG. 8, that is decodable by the second mobile communication terminal MS(2).

Accordingly, the present invention provides several advantages,

First, when transmission of a graphic emoticon is requested in a first mobile communication terminal, the emoticon is converted to a format decodable by a mobile communication terminal to which the emoticon is to be transmitted. The format-converted emoticon is transmitted to the intended mobile communication terminal and the intended mobile communication terminal can display the received graphic emoticon without fail.

Second, since compatibility of graphic emoticons is ensured regardless of mobile terminal manufacturer or communication service provider, a wireless data service can be used more frequently and efficiently, and the demand for a terminal storing various graphic emoticons increases.

Finally, the transmission of a graphic emoticon is requested in a mobile communication terminal, the requested emoticon is converted and only identification information of the converted emoticon need be transmitted to an intended mobile communication terminal if the intended mobile communication terminal stores the emoticon. Therefore, the intended mobile communication terminal may decode the requested emoticon without failure more efficiently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting emoticons in an emoticon transmitting system, the method comprising:

receiving, via a transmission request receiving unit of the emoticon transmitting system, a message from a transmitting mobile communication terminal requesting transmission of a first graphic emoticon the message comprising first emoticon identification information related to the first graphic emoticon and a phone number of a receiving mobile communication terminal;

identifying, via a converting unit of the emoticon transmitting system, a communication service provider of the receiving mobile communication terminal using the phone number of the receiving mobile communication terminal;

identifying, via the converting unit, a second graphic emoticon corresponding to the first graphic emoticon using the first emoticon identification information and the identified communication service provider of the receiving mobile communication terminal, wherein a format of the first graphic emoticon differs from a format of the second graphic emoticon, and the format of the first graphic emoticon is not decodable or displayable in the receiving mobile communication terminal; and transmitting, via a transmitting unit of the emoticon transmitting system, second emoticon identification information to the receiving mobile communication terminal, the second emoticon identification information related to the second graphic emoticon, wherein the second emoticon identification information comprises data in a format decodable by the receiving mobile communication terminal, wherein the second graphic emoticon is displayable in the receiving mobile communication terminal, wherein the second emoticon identification information is different from the first emoticon identification information, and wherein the emoticon transmitting system is separate from the transmitting mobile communication terminal and the receiving mobile communication terminal.

2. The method of claim 1, wherein the message further comprises metadata related to the first graphic emoticon.

3. The method of claim 1, wherein the message further comprises terminal information related to the communication service provider of the transmitting mobile communication terminal.

4. The method of claim 1, wherein the message conforms to at least one specification for a multimedia message service (MMS).

5. The method of claim 1, wherein identifying the second graphic emoticon comprises:
   identifying a category of the first graphic emoticon according to the first emoticon identification information; and
   identifying the second emoticon identification information corresponding to the category.

6. The method of claim 1, wherein transmitting the second emoticon identification information is performed according to at least one specification for a multimedia message service (MMS).

7. The method of claim 1, wherein the second emoticon identification information comprises image data of the second graphic emoticon.

8. The method of claim 1, wherein the second emoticon identification information comprises information related to an emoticon stored in the receiving mobile communication terminal.

9. An apparatus for transmitting emoticons in an emoticon transmitting system, the apparatus comprising:
   a transmission request receiving unit adapted to receive a message from a transmitting mobile communication terminal requesting transmission of a first graphic emoticon, the message comprising first emoticon identification information related to the first graphic emoticon and a phone number of a receiving mobile communication terminal;
   a converting unit adapted to identify a communication service provider of the receiving mobile communication terminal using the phone number of the receiving mobile communication terminal and to identify a second graphic emoticon corresponding to the first graphic emoticon using the first emoticon identification information and the identified communication service provider of the receiving mobile communication terminal; and
   a transmitting unit adapted to transmit second emoticon identification information to the receiving mobile communication terminal, the second emoticon identification information related to the second graphic emoticon,
   wherein the second emoticon identification information comprises data in a format decodable by the receiving mobile communication terminal,
   wherein the second graphic emoticon is displayable in the receiving mobile communication terminal,
   wherein a format of the first graphic emoticon differs from a format of the second graphic emoticon,
   wherein the format of the first graphic emoticon is not decodable or displayable in the receiving mobile communication terminal,
   wherein the second emoticon identification information is different from the first emoticon identification information, and
   wherein the emoticon transmitting system is separate from the transmitting mobile communication terminal and the receiving mobile communication terminal.

10. The apparatus of claim 9, further comprising an emoticon database comprising conversion data related to a correspondence between the second graphic emoticon and the first graphic emoticon and wherein the converting unit is adapted to identify the second graphic emoticon according to the first emoticon identification information with reference to the emoticon database.

11. The apparatus of claim 9, wherein the message further comprises metadata related to the first graphic emoticon.

12. The apparatus of claim 9, wherein the message further comprises terminal information related to the communication service provider of the transmitting mobile communication terminal.

13. The apparatus of claim 9, wherein the transmission request receiving unit is further adapted to receive a message conforming to at least one specification for a multimedia message service (MMS).

14. The apparatus of claim 9, wherein the converting unit is further adapted to identify the second graphic emoticon by:
   identifying a category of the first graphic emoticon according to the first emoticon identification information; and
   identifying the second emoticon identification information corresponding to the category.

15. The apparatus of claim 9, wherein the transmitting unit is further adapted to transmit the second emoticon identification information according to at least one specification for a multimedia message service (MMS).

16. The apparatus of claim 9, wherein the second emoticon identification information comprises image data of the second graphic emoticon.

17. The apparatus of claim 9, wherein the second emoticon identification information comprises information related to an emoticon stored in the receiving mobile communication terminal.

* * * * *